April 14, 1970     B. H. CHRISTENSEN     3,506,185
SHOPPING BAG
Filed June 28, 1968
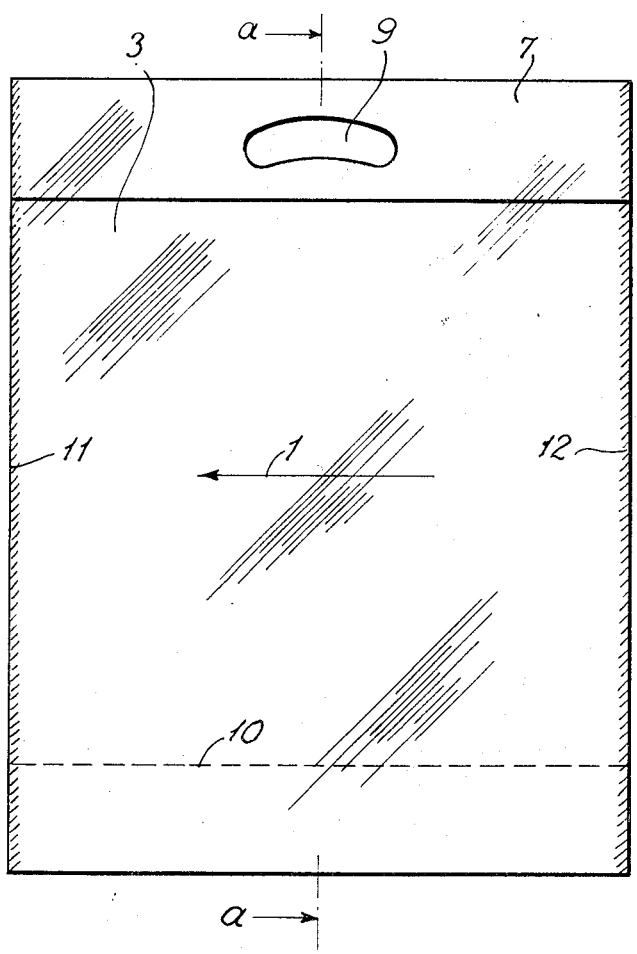
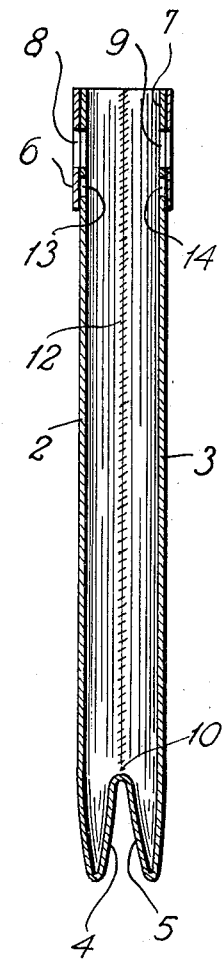
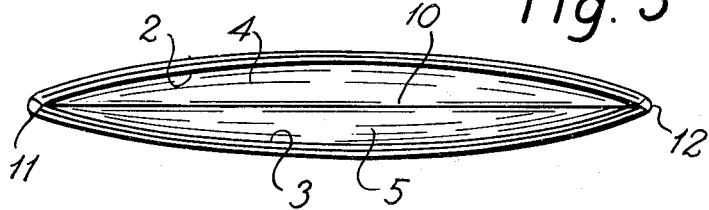
INVENTOR.
Borge Hauman Christensen
BY
Cushman, Darby & Cushman
Attorneys

United States Patent Office 3,506,185
Patented Apr. 14, 1970

3,506,185
SHOPPING BAG
Børge Houman Christensen, Vejen, Denmark, assignor to Rolles Fabriker v./U.J. Christensen, Vejen, Denmark
Filed June 28, 1968, Ser. No. 741,002
Int. Cl. B65d 33/02, 33/08
U.S. Cl. 229—55      2 Claims

ABSTRACT OF THE DISCLOSURE

A shopping bag of thin plastic foil having a handle at the open end constituted by an opening in the two bag sides, the rim portion including said opening being reinforced by a separate strip which is welded or glued to the bag and has corresponding apertures.

BACKGROUND OF THE INVENTION

Known is the making of shopping bags of thin plastic foil preferably polythene foil and of the kind reinforced at the handle and the mouth of the bag, e.g. by folding the border of the mouth of the bag and subsequently welding on the—inward or outward—folded border to that portion of the bag towards which the border is deflected.

A reinforcement of this kind will not exceed in thickness twice the thickness of the foil, i.e. frequently about 2 x 0.04 millimeters polythene foil. The reinforcement is usually fixed to the foil by means of a linear seam only, the deflected border thus being rigidly affixed to the rest of the bag along this line, thus setting narrow bounds for the reinforcement obtained, in that the pull in the handle does not distribute evenly between the deflected border and the opposing portions of the mouth of the bag.

Further process difficulties easily arise by controlling the folding in of a narrow strip from a web plastic foil not readily pleated like paper and with inherent problems of static electricity which are at least comparable with those of the paper web.

It is also known to make a plastic shopping bag, the mouth of which is made integrally with the plastic foil during the extrusion, but in a thickness considerably larger than that of the rest of the foil. E.g. the foil may be 0.05 millimetre except for the borders making up the mouth of the bag, whereas said borders are approximately 0.25 millimetre gauge.

Per se an excellent shopping bag is obtained with a very strong handle (mouth), in which the pull in the handle distributes excellently along the whole width of the bag.

The extrusion and working up of the foil, however, presented great difficulties due to the uneven cooling of the 0.05 millimetre foil and its much heavier border, and due to the consequently arising distortions. A great percentage of waste was experienced at the extrusion process already, and even the foil actually used for further making up proved rather inaccurate and gave rise to excessive waste in printing, reeling, slitting, cutting and further processing.

It is an object of this invention to make a plastic shopping bag provided with a heavily reinforced mouth, and thus arranged that reinforcement and bag will co-operate just as well or approximately just as well in distributing the pull from the handle, as if the reinforcement had been made integrally with the rest of the bag.

A further object of the invention is to provide for a method of industrial manufacture of a shopping bag thus reinforced, reducing the costs of manufacture to comparability with the costs of shopping bags reinforced by means of a deflected border.

SUMMARY OF THE INVENTION

In accordance with the invention the shopping bag is made of thin plastic foil, preferably polythene, having a closed end and an open end, adjacent the open end an aperture forming a handle being provided in each of the bag sides, the rim portion at the open end being reinforced by one or more strips, preferably of a heavier gauge of plastic foil and welded or glued to the bag sides and having apertures opposite the apertures in the bag sides.

In this way a bag is achieved, in which the marginal reinforcement within reasonable limits may be made in any desired thickness.

Further the bag is arranged in such a way, that the marginal reinforcement with certainty will distribute the pull in the handle fairly across the whole width of the bag, and the portions of the bag which are exposed to influence of the pull are sealed by means of a welding seam, this weld further participating in the distribution of the pull in the handle and in avoiding tearing of the foil caused by local peak loads.

The heavy marginal reinforcement in complete co-operation with the thin foil of the bag further counteracts pursing up of the mouth of the bag and puckering of the bag. E.g. in bags with a deflected border reinforcement, both pursing up and puckering disfigures the advertising image printed on the bag, and consequently reduce the advertising value of this known shopping bag considerably in comparison with that of the bag made in accordance with the invention.

Still further, in the bag according to the invention, it is possible without any inconveniences to use reinforcement ribbons in colours differing from the colour of the bag foil, which may be of advertising as well as orderly significance.

In accordance with the invention the bag may be manufactured by a method where an endless web of plastic foil is moved axially and folded along a line parallel to the edges of the web for constituting the closed end of the bags, a strip of reinforcement material being mounted on the web at each of its edges and connected to the web by welding or gluing before or after the folding operation, the folded and reinforced web being provided with handle apertures and cross welding seams and cuttings for providing a plurality of separate bags.

It is a very great advantage to affix the reinforcements continuously in the direction of feed of the plastic foil, thereby obtaining a method of continuous manufacture suited for mass production, and simultaneously the cutting off and end sealing of the reinforcements are in a simple way united in one very simple and reliable operation. In consequence of the quick and effortless manufacture, and because a very thin foil may without any inconvenience be used for making the bag, the manufacture of the bag with a heavily reinforced border compares favourably in costs with the shopping bag with deflected border reinforcement.

Glue does not stick very well to polythene, and accordingly the method in accordance with the invention appropriately is so arranged, that each reinforcing strip is covered on the one side with a pressure sensitive glue and the rim portions of the material web are treated with a high frequency high tension electric arc.

The use of self-adhesive reinforcement ribbons is advantageous in view of its cleanness and security in the bag making machine, but it demands a preliminary electronic treatment of the bag foil as specified above. A properly made glue seal also results in a more appealing outlook than an ordinary heat welding, and the transmission of forces from foil to reinforcement will by gluing be evenly distributed.

BRIEF DESCRIPTION OF THE DRAWING

An embodiment of the shopping bag in accordance with the invention and a method for the manufacture of the bag will be described in detail with reference to the drawing, in which FIGURE 1 is a plan view of the bag, FIGURE 2 is a vertical section of the bag of FIGURE 1 along the line a—a, and FIGURE 3 is a top view of the shopping bag.

DESCRIPTION OF THE PREFERRED EMBODIMENTS

An arrow 1 in FIGURE 1 indicates the direction of feed in the bag making machine of an approximately 0.03–0.07 millimetre polythene foil, forming after processing the sides 2, 3 and a bottom comprising two folds 4 and 5 in a shopping bag.

At the top of the bag the thin polythene foil of the mouth is reinforced by means of two reinforcement ribbons 6, 7 of approximately 0.10–0.30 millimetre polythene foil. For use as a handle the mouth of the bag is perforated by two oblong apertures 8 and 9, both of them penetrating both the thin foil and the considerably heavier reinforcement ribbon.

Before placing the bag foil in the bag making machine or during unwinding the foil in the machine, the foil is folded to show a section like FIGURE 2 comprising two "sides" 2 and 3 and a "bottom fold" 4, 5 with a top fold 10.

Simultaneously or immediately afterwards the reinforcement ribbons 6 and 7 are stuck on, and the reinforced foil is fed into the cutting off section of the bag making machine to have the bag cut off in proper width and simultaneously welded together with seams 11 and 12 along the edges of the bag, the cutting off being carried out by means of an electrically heated knife. The reinforcement ribbons 6, 7 are cut off in the same operation and their ends welded together, and further they are welded together with the sides 2, 3 of the bag into one continuous weld 11 and 12, respectively.

At the mouth of the bag the thin foil may be provided with a number of perforations 13 and 14 facing each other. These perforations result in a corresponding number of "glue spots" facing the interior of the bag for sealing purposes when the bag is closed.

In the specification above polythene is suggested as a material par example, but other plastics may be employed.

Above—also by means of example—suitable foil gauges are suggested. The gauges mentioned are not decisive. Important is, however, that the new bag may be made of a thin foil reinforced with a heavy reinforcement for even distribution of forces between foil and reinforcement, and that the risk of tearing the foil respectively of tearing apart the welding or glue seal is very small.

What is claimed is:

1. A shopping bag comprising:
    a sheet of thin plastic foil doubled back upon itself and sealed along two marginal edges thereof to define, an unseamed bottom, two seamed side edges and an open mouth, said open mouth being defined by two upper edges of said sheet opposite said unseamed bottom;
    said sheet having secured thereon, adjacent each of said upper edges, a strip of thicker plastic foil than the foil of said sheet, both strips extending between said two seamed side edges; and means defining a handle slot through each strip and means defining two slots through said sheet in registry with the slots through the strips.

2. A shopping bag in accordance with claim 1 wherein said strips are secured to said sheet exteriorly of said mouth, the securing being provided by a layer of adhesive material interposed between each strip and said sheet; and means defining a plurality of openings through said sheet underlying each strip, said layer of adhesive interposed between each strip and said sheet being exposed through said openings to define spots where said bag mouth may be closed by engaging said adhesive layer in said spots at the two respective upper edges of the bag with the interior of the sheet at the respective opposite upper edges of the bag.

References Cited

UNITED STATES PATENTS

| 3,255,951 | 6/1966 | Kay | 229—54 |
| 3,256,941 | 6/1966 | Rivman | 229—62 |
| 3,302,860 | 2/1967 | Schwarzkopf | 229—54 |

DAVID M. BOCKENEK, Primary Examiner

U.S. Cl. X.R.

150—12; 229—54